United States Patent
Casoni et al.

(10) Patent No.: US 7,634,914 B2
(45) Date of Patent: Dec. 22, 2009

(54) CORRECTED PARAMETER CONTROL METHOD FOR A TWO-SHAFT GAS TURBINE

(75) Inventors: Andrea Casoni, Florence (IT); Stefano Groppi, Monsummano Terme (IT); Alessandro Russo, Pisa (IT)

(73) Assignee: Nuovo Pignone Holding S.p.A., Florence (IT)

( * ) Notice: Subject to any disclaimer, the term of this patent is extended or adjusted under 35 U.S.C. 154(b) by 508 days.

(21) Appl. No.: 10/539,271

(22) PCT Filed: Dec. 10, 2003

(86) PCT No.: PCT/EP03/14174

§ 371 (c)(1), (2), (4) Date: Apr. 24, 2006

(87) PCT Pub. No.: WO2004/055340

PCT Pub. Date: Jul. 1, 2004

(65) Prior Publication Data

US 2006/0242963 A1    Nov. 2, 2006

(30) Foreign Application Priority Data

Dec. 17, 2002    (IT)    .................. MI2002A2660

(51) Int. Cl.
  *F02C 9/00*    (2006.01)
(52) U.S. Cl. ..................... 60/773; 60/39.281
(58) Field of Classification Search ............ 60/773, 60/779, 39.091, 39.281
  See application file for complete search history.

(56) References Cited

U.S. PATENT DOCUMENTS 4,314,441 A * 2/1982 Yannone et al. .......... 60/39.281
4,809,497 A * 3/1989 Schuh ....................... 60/39.27

FOREIGN PATENT DOCUMENTS

| EP | 0 728 919 A1 | 8/1996 |
| EP | 1231369 A2 | 8/2002 |
| JP | 11159756 A | 6/1999 |
| JP | 11343868 A | 12/1999 |
| JP | 2002259505 A | 9/2002 |
| JP | 2003206749 A | 7/2003 |

OTHER PUBLICATIONS

Chinese Office Action for Appln No. 200380109314.5 (3 pages).
International Search Report for PCT/EP03/014174, mailed May 28, 2004.
Office Action for JP 2004-560395 dated Jul. 21, 2009.

* cited by examiner

*Primary Examiner*—Michael Cuff
*Assistant Examiner*—Phutthiwat Wongwian
(74) *Attorney, Agent, or Firm*—Potomac Patent Group PLLC

(57) ABSTRACT

A control method for a gas turbine engine is described. The control method includes, for example, corrected control parameters which are adjusted for environmental and/or operating parameters. Control of a fuel valve and a bleed valve in the gas turbine are described relative to various control algorithms.

37 Claims, 15 Drawing Sheets

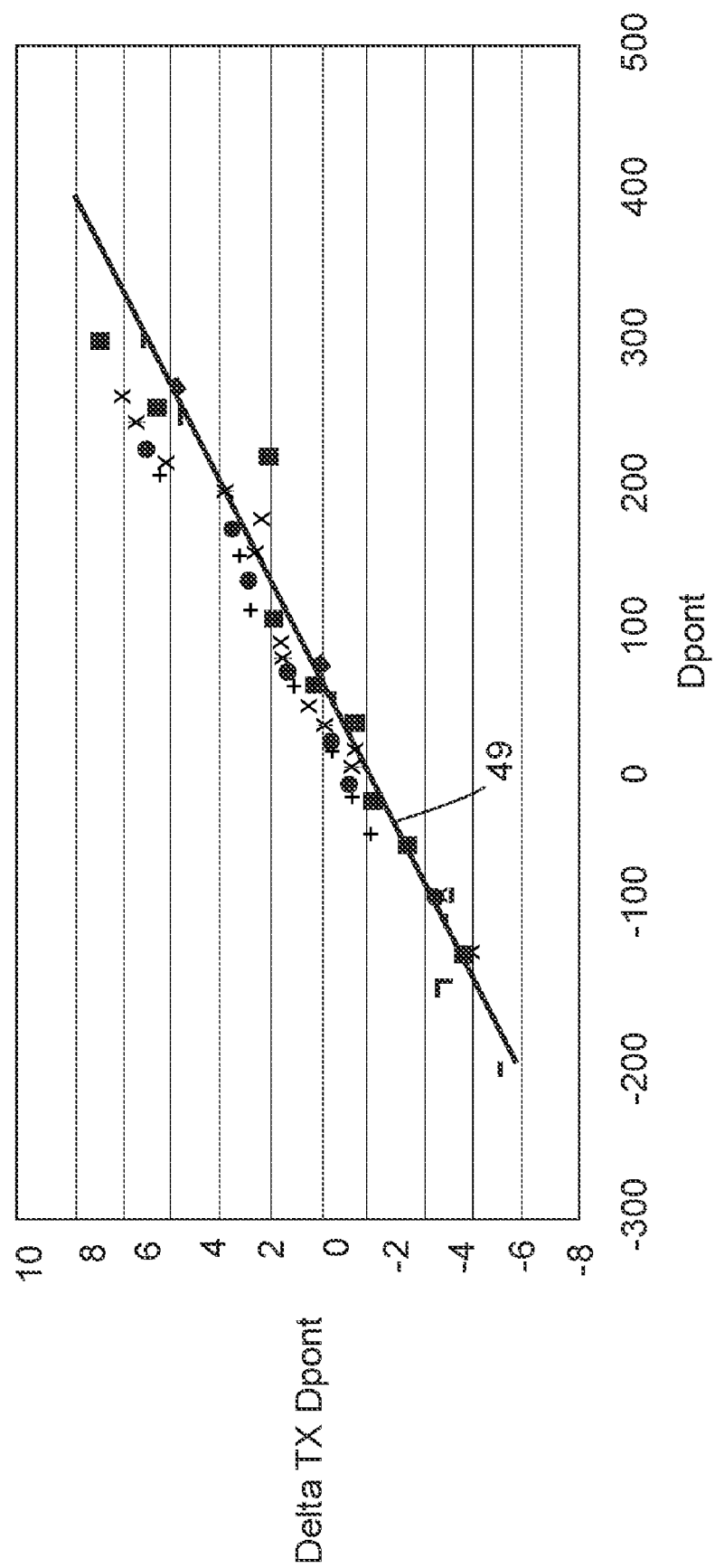

CORRECTED PARAMETER CONTROL METHOD FOR A TWO-SHAFT GAS TURBINE

CROSS-REFERENCE TO RELATED APPLICATIONS

This application is a National Phase Application of International Application No. PCT/EP2003/014174, filed Dec. 10, 2003, which claims the priority of Italian Patent Application No. M12002A002660, filed Dec. 17, 2002. The present application claims priority from both applications.

TECHNICL FIELD

The present invention relates to a corrected parameter control method for a two-shaft gas turbine.

BACKGROUND

As is known, a two-shaft gas turbine is a machine consisting of a compressor, one or more combustion chambers, and two turbine wheels with one or more stages; one turbine wheel is connected by a shaft to the compressor, while the other wheel is connected to the load by the second shaft.

Air taken from the external environment is fed to the compressor to be pressurized. The compressor can be provided with suitable vent valves, also known as bleed valves, which discharge some of the compressed air to the atmosphere.

The pressurized air passes over the outside of the combustion chamber jackets, thus cooling them, and then reaches a set of burners which have the function of mixing the air and the fuel gas (obtained from external pipes), thus providing a gas-air mixture for burning. The pre-mixing of the air with the gas enables the local temperature to be contained in the following primary combustion region, thus limiting the formation of pollutants such as nitrogen oxides.

The combustion reaction takes place inside the jackets, where the temperature and consequently the enthalpy of the gases are increased.

The gas at high temperature and high pressure then passes through suitable pipes to the different stages of the turbine, which converts the enthalpy of the gas to mechanical energy available to a user.

It is known that, in order to obtain the maximum efficiency of any given gas turbine, the temperature of the gas at the inlet to the first turbine wheel, referred to below as the temperature TFire, must be as high as possible; however, the maximum temperatures that can be reached during the use of the turbine are limited by the strength of the materials used.

It is also known that, in order to obtain low emission of pollutants, the fuel-air ratio (abbreviated to F/A in the following text) must be suitably controlled; however, the acceptable values of F/A are limited by problems of loss of ignition in the gas turbine or the generation of pressure pulsations in the combustion chamber.

In practice, there is a requirement to design a thermodynamic cycle for the two-shaft gas turbine which will yield high efficiency combined with low emission of pollutants.

However, the nominal thermodynamic cycle of a gas turbine is modified in practical applications by disturbance factors such as:
- variations of environmental conditions (pressure, temperature and humidity);
- variations of pressure drops in the inlet air intake pipes;
- variations of the pressure drops in the exhaust gas discharge pipes;
- variations of the speed of the low pressure shaft (connected to the user).

If due allowance is not made for these disturbance factors, they may have the following effects:
- failure to achieve the maximum temperature TFire at the inlet of the first turbine wheel in full load conditions (with consequent reduction of the thermodynamic performance of the turbine);
- exceeding of the maximum temperature TFire at the inlet of the first turbine wheel in full load conditions, with consequent reduction of the maintenance interval for the turbine;
- failure to achieve the correct fuel-air ratio F/A in the combustion chamber with a consequent increase in the emission of pollutants such as nitrogen oxides (also abbreviated to $NO_x$ in the following text) and carbon monoxide, and the appearance of dangerous pressure pulsations in the combustion chamber or loss of ignition in the combustion chamber.

SUMMARY

The object of the present invention is therefore to provide a method for controlling TFire and F/A which can overcome the aforementioned problems, particularly by proposing a corrected parameter control method for a two-shaft gas turbine which enables high machine efficiency to be achieved together with low emission of pollutants.

Another object of the present invention is to propose a corrected parameter control method for a two-shaft gas turbine which is reliable and is applied by means of simple relations which are easily implemented on the control panels of the machine.

These and other objects of the present invention are achieved by proposing a corrected parameter control method for a two-shaft gas turbine as disclosed in Claim 1.

Further characteristics of the corrected parameter control method for a two-shaft gas turbine are specified in the subsequent claims.

BRIEF DESCRIPTION OF DRAWINGS

The characteristics and advantages of a corrected parameter control method for a two-shaft gas turbine according to the present invention will be made clearer by the following description, provided by way of example and without restrictive intent, which refers to the attached schematic drawings in which:

FIG. 13 shows the correlation between the variation of exhaust temperature required to achieve nominal F/A and the variation of the pressure drops in the exhaust pipes with respect to the standard value of 0 mmH20.

With reference to the figures, a corrected parameter control method for a two-shaft gas turbine is indicated.

Figure 14A:
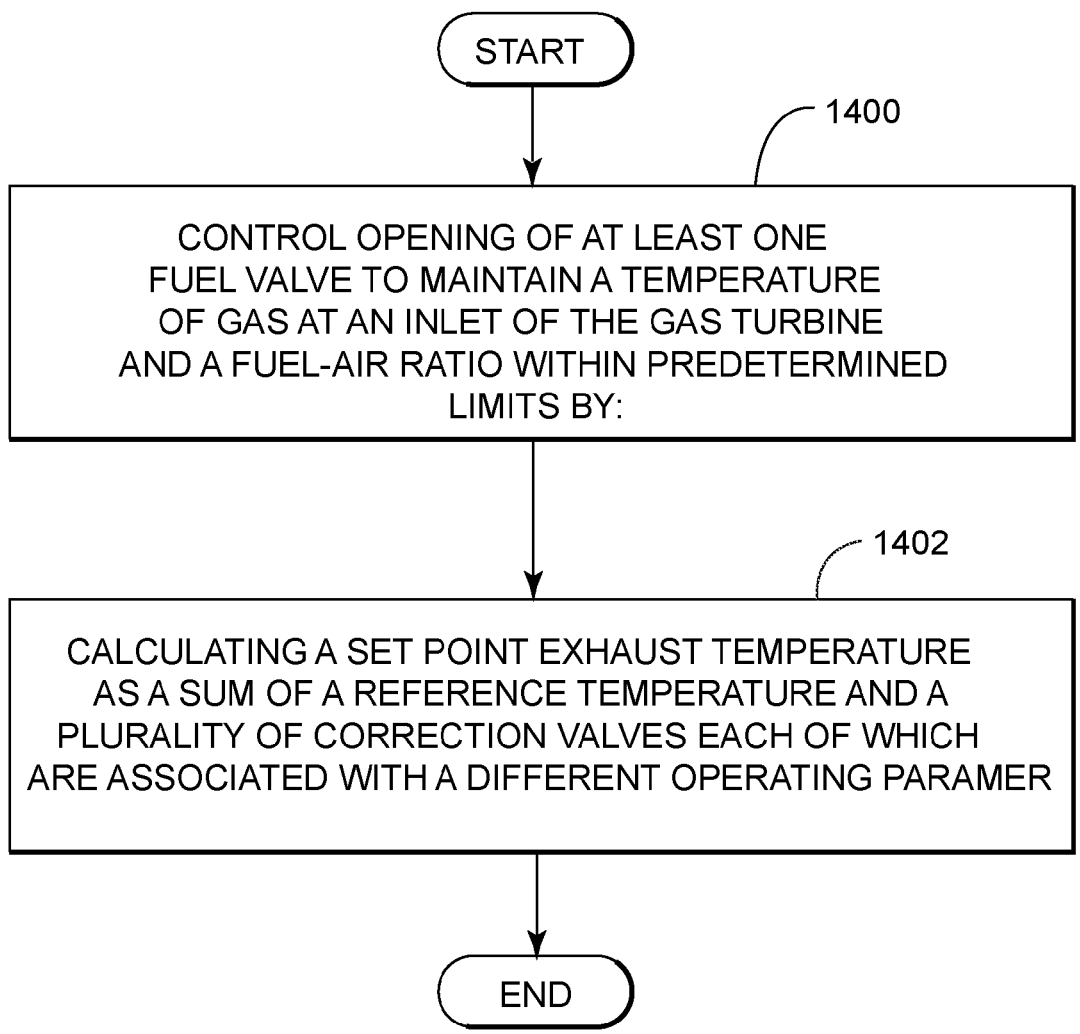

FIG. 14a shows a flowchart for methods to control a fuel valve opening of turbine engine.

Figure 14B:
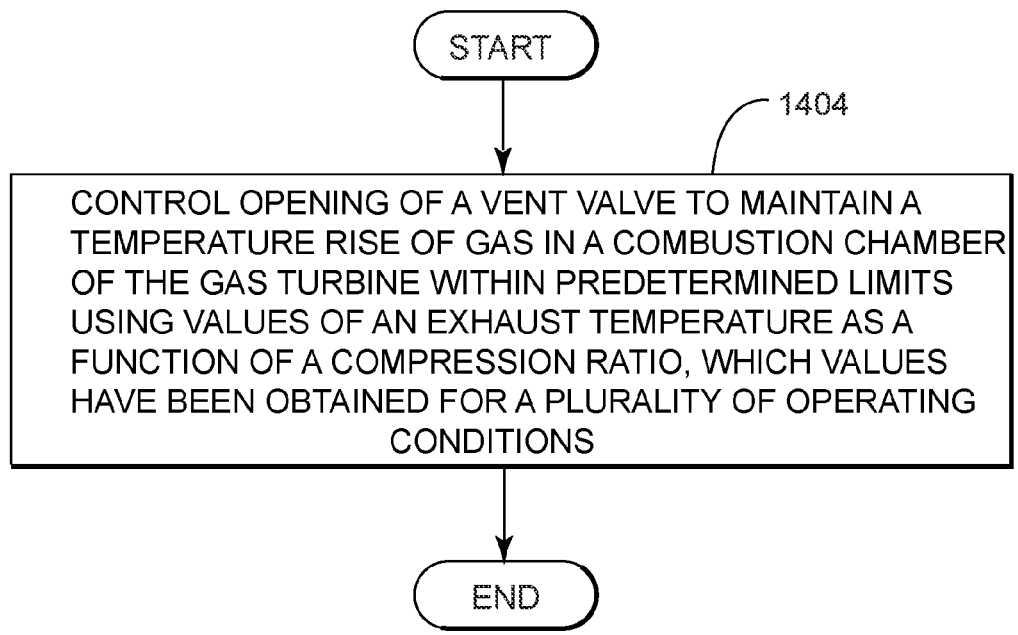

FIG. 14b shows a flowchart for methods to control a vent valve opening of a trubine engine.

DETAILED DESCRIPTION

The control system consists of two feedback control loops by means of which the following actions are carried out independently:
1. First loop: protection of the machine by limiting the opening of the fuel valves to keep TFire and F/A within specified limits;
2. Second loop: control of F/A by controlling the opening of the bleed valve.

We shall start with a discussion of the control loop for protecting the machine from high values of TFire or F/A.

The limit operating conditions at full load are encountered when one of the following cases is present:
the maximum fuel to air ratio F/A is reached in the combustion chamber, in other words there is a maximum temperature increment Trise of the gases in the combustion chamber;
the maximum temperature TFire is present.

These limits can be expressed in the form of a curve on a plane PR-TX, in other words a curve showing the exhaust temperature TX as a function of the compression ratio PR of the axial compressor: when conditions on this curve are reached, the flow of fuel is reduced, so that the curve represents a curve of maximum permissible exhaust temperature.

Figure 1:
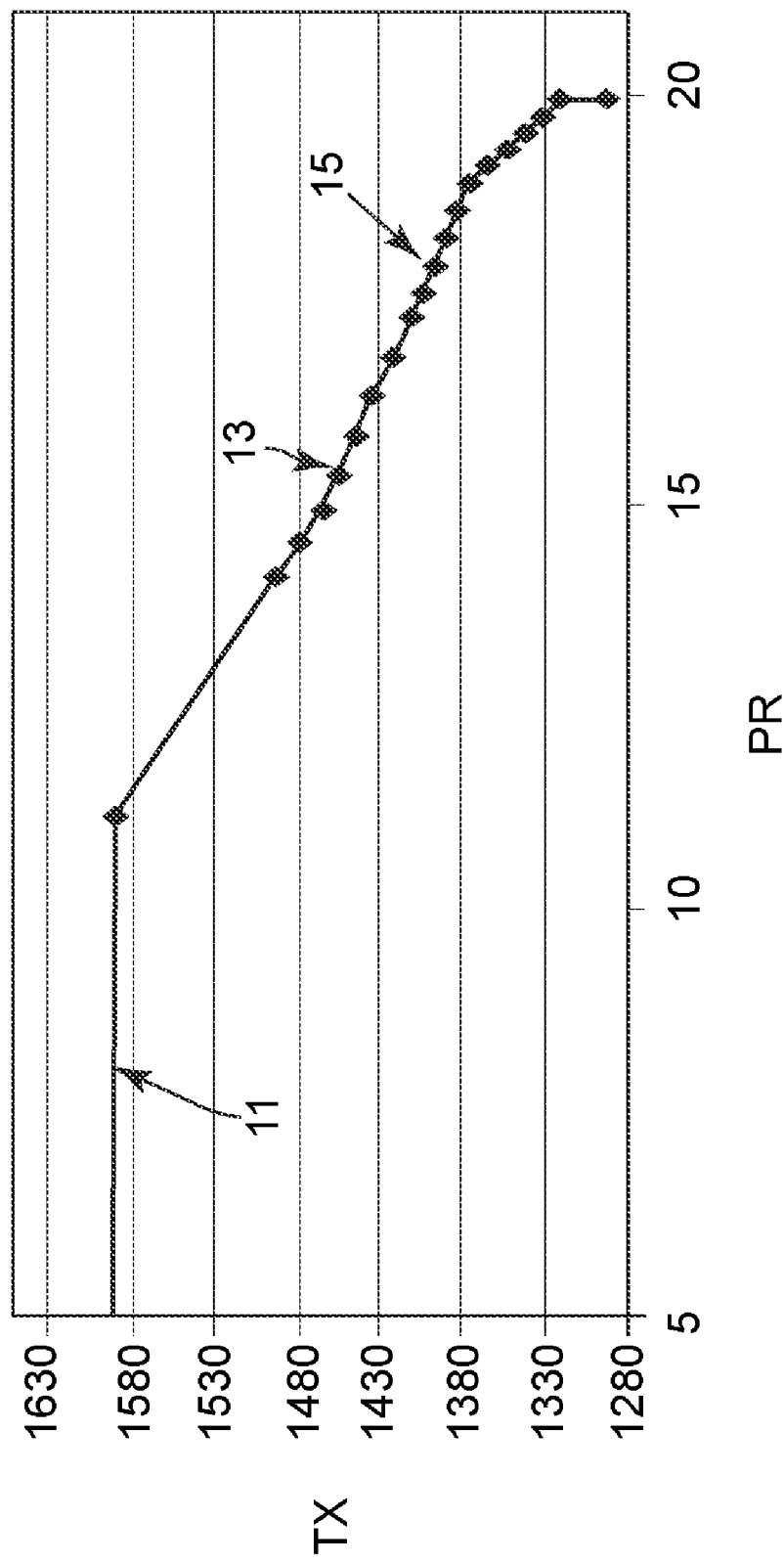
FIG. 1 shows a correlation between the exhaust temperature TX and the compression ratio PR relating to operating conditions in which the machine has reached the limit value of TFire or F/A in standard conditions, in other words where the speed of the low pressure wheel is 100%, the pressure drops are zero in the intake and exhaust pipes and the relative humidity is 60%; this curve shows the maximum permissible exhaust temperature for the gas turbine.

FIG. 1 shows a diagram of an example of a curve of maximum permissible exhaust temperature TX, expressed in degrees Rankine, at 100% of the load speed (in other words the speed of the low pressure shaft to which the load is applied) with pressure drops of 0 mmH20 at the intake and exhaust and 60% relative humidity, as a function of the compression ratio PR.

More precisely, the curve in the diagram of FIG. 1 has three zones.

For low compression ratios PR, there is a horizontal zone 11 of maximum exhaust temperature TX, due to limits on the materials of the exhaust pipe. As the compression ratio PR increases, the curve descends with a zone 13 where the limit due to the maximum TFire is applicable.

The curve continues with a zone 15 where the limit of maximum Trise is the determining factor, and the temperature TX decreases further as the compression ratio PR increases.

Figure 2:
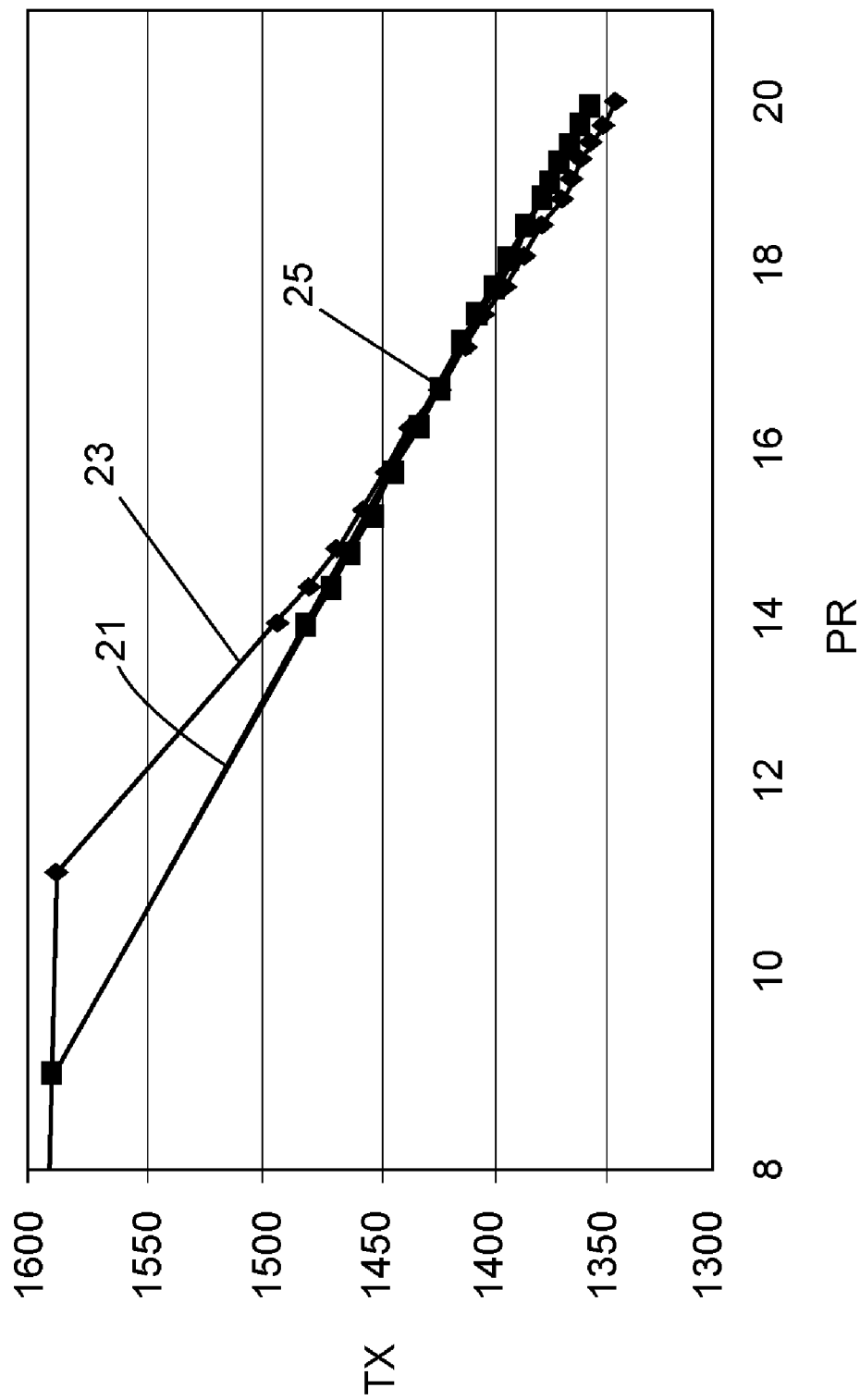
FIG. 2 shows two curves of the maximum exhaust temperature in standard operating conditions: the first curve 21 represents the curve of maximum exhaust temperature due to the attainment of the limit value of TFire; the second curve 23 represents the curve of maximum exhaust temperature due to the attainment of the limit value of F/A.

FIG. 2 shows two curves of maximum permissible exhaust temperature TX, as functions of the compression ratio PR.

More precisely, there is a curve 21 related to the maximum temperature TFire and a curve 23 related to the maximum Trise. The two curves 21 and 23 have a trend which is linear to a first approximation, with a negative slope; in particular, the two curves intersect at 25.

The control curve for the actual temperature TX is determined by selecting the minimum temperature TX from the curves 21 and 23, for each compression ratio PR.

Thus at low compression ratios PR the maximum TFire is the determining factor, while the limit of maximum Trise becomes decisive from the intersection 25 onwards.

The curve 21 related to the maximum TFire protects the machine from damage caused by excess temperatures due to overheating, and is always active.

On the other hand, the curve 23 depends on the maximum permissible F/A ratio, and therefore on the maximum Trise, and can be modified to meet the specific requirements of the combustion system.

It is therefore useful to have the two curves 21 and 23 additionally available in two separate diagrams, so that two different reference points or set points can be established for the TX controller of the fuel control loop. A minimum selector will select the appropriate set point of exhaust temperature TX, by selecting the minimum from the values of TX obtained by entering the curve 21 and the curve 23 with the compression ratio PR.

Ultimately, each environmental condition and each load characteristic on the low pressure shaft requires a specific temperature control curve.

In order to take the different situations into account, the corrected parameter control method for a two-shaft gas turbine is implemented according to the following formula, in order to ensure that the gas turbine is always in an ideal configuration:

$$TX = TXbase + \Delta TX\_DPin + \Delta TX\_DPout + \Delta TX\_Hum + \Delta TX\_PCNLP$$

Figure 3:
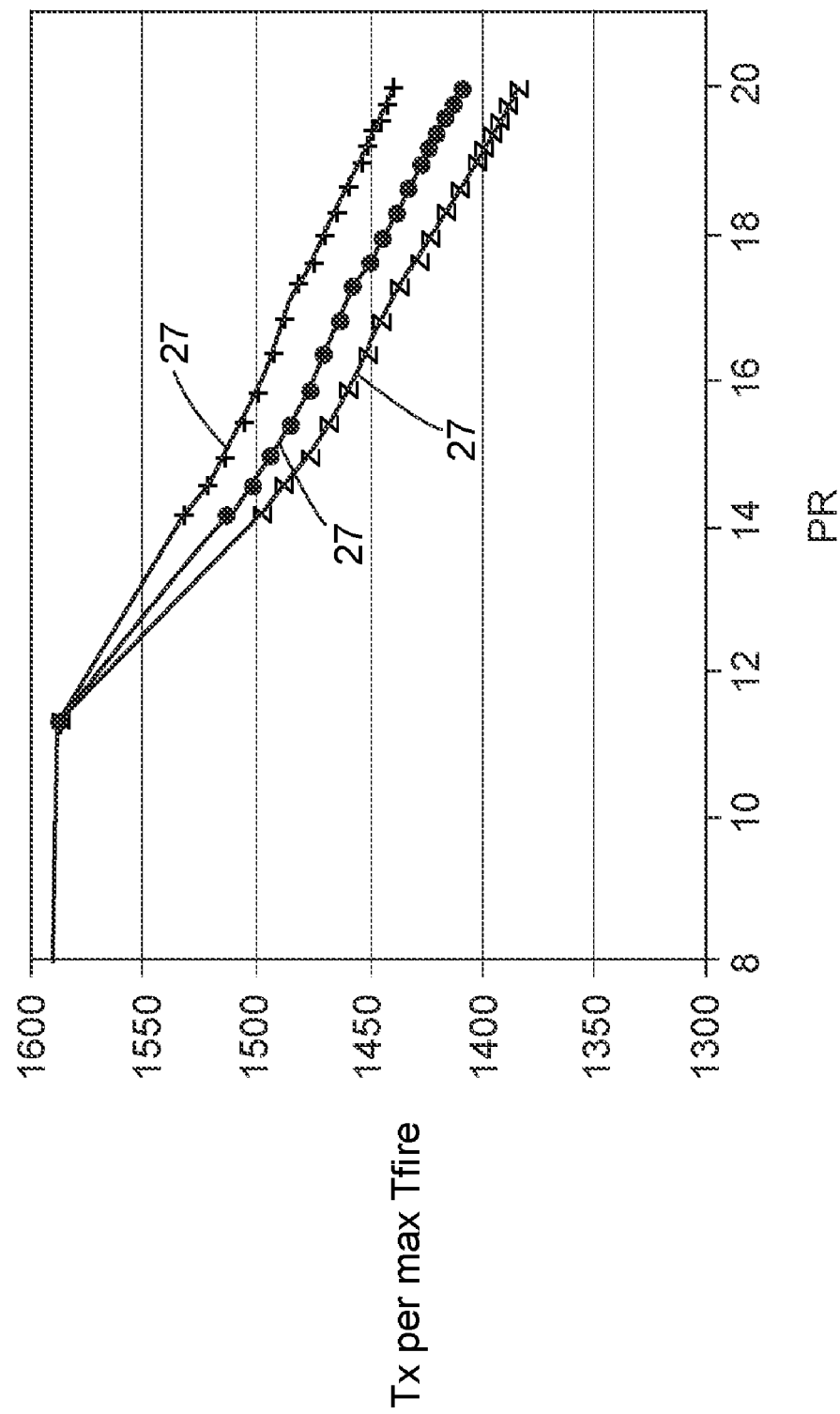
FIG. 3 shows how the curve of maximum exhaust temperature due to the limit value of TFire is modified by the variation of the speed of the low pressure wheel.
Figure 4:
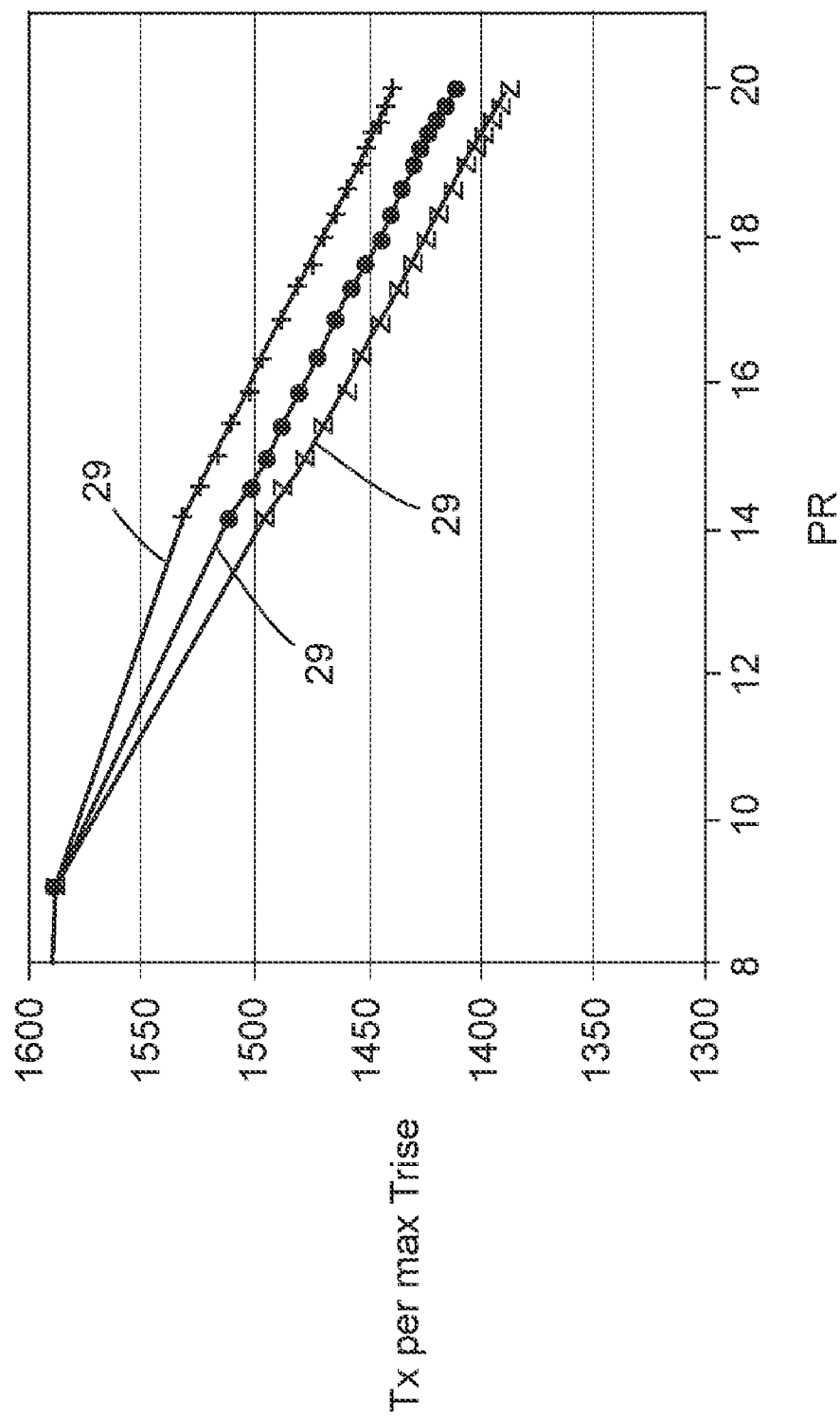
FIG. 4 shows how the curve of maximum exhaust temperature due to the limit value of F/A is modified by the variation of the speed of the low pressure wheel.
Figure 5:
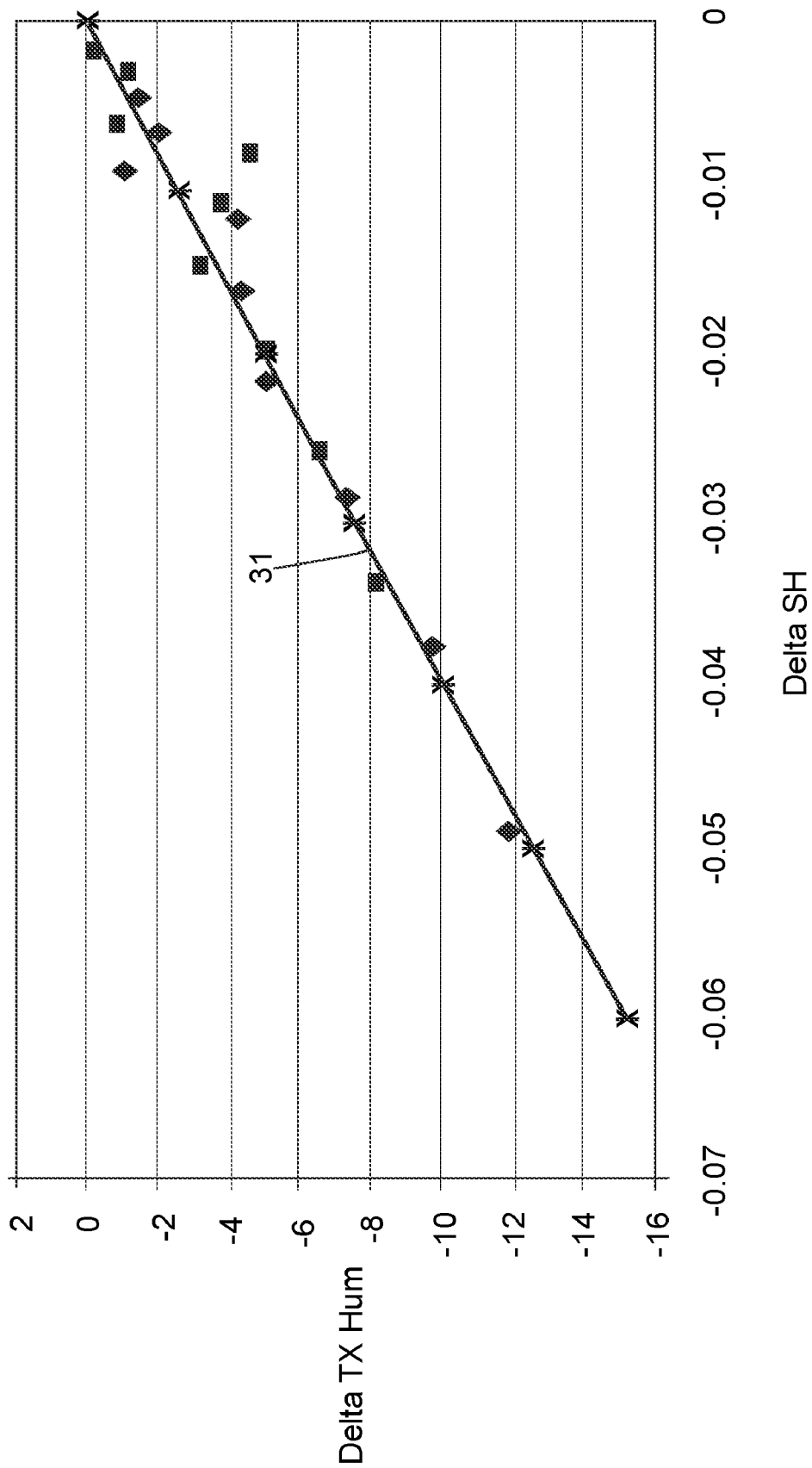
FIG. 5 is a diagram of the correlation between the variation of maximum exhaust temperature due to a variation of the environmental humidity with respect to the standard value of 60%.
Figure 6:
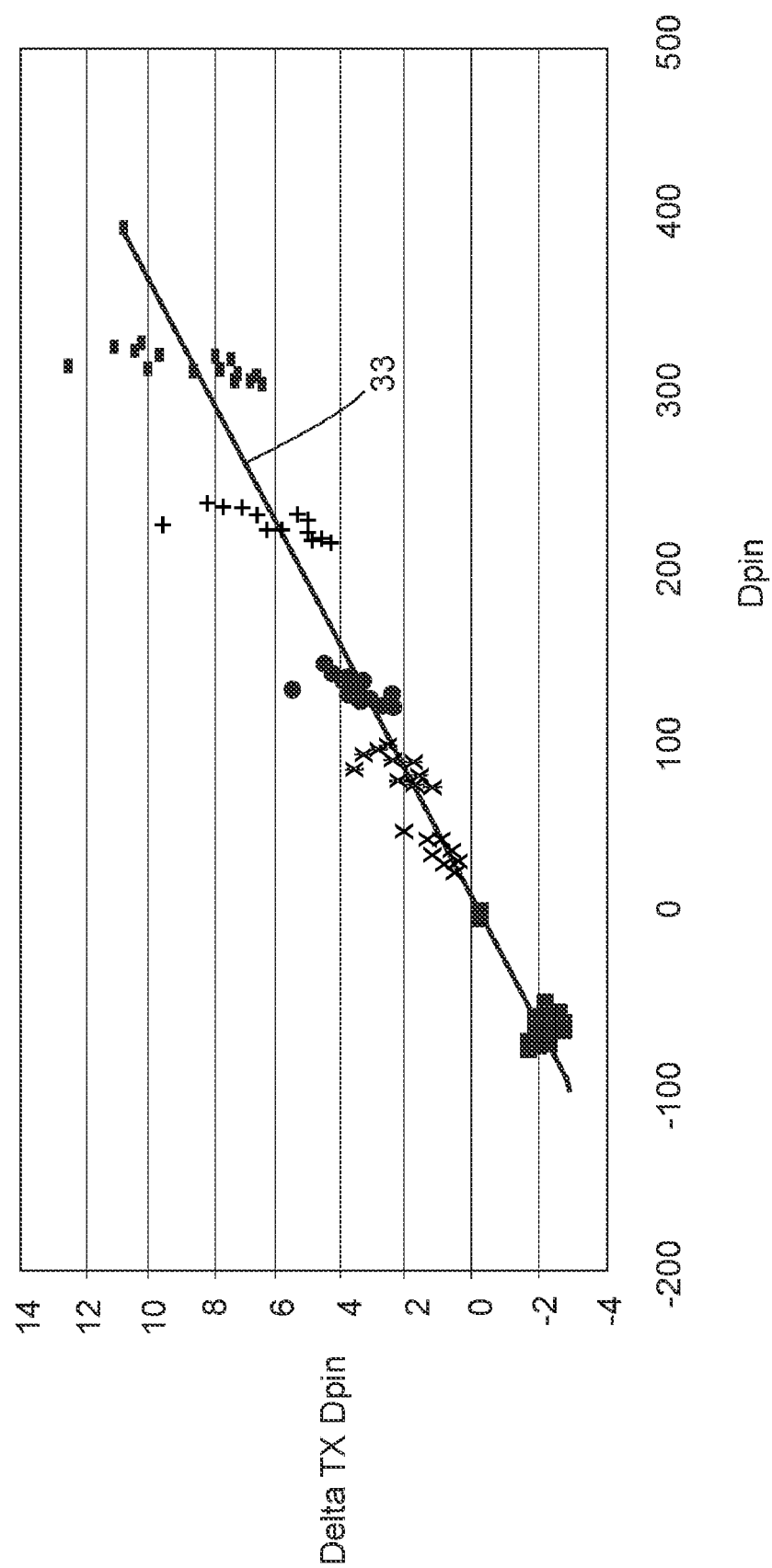
FIG. 6 shows the correlation between the variation of maximum exhaust temperature and the variation of the pressure drops in the inlet pipes with respect to the standard value of 0 mm of water (abbreviated to 0 mmH2O)
Figure 7:
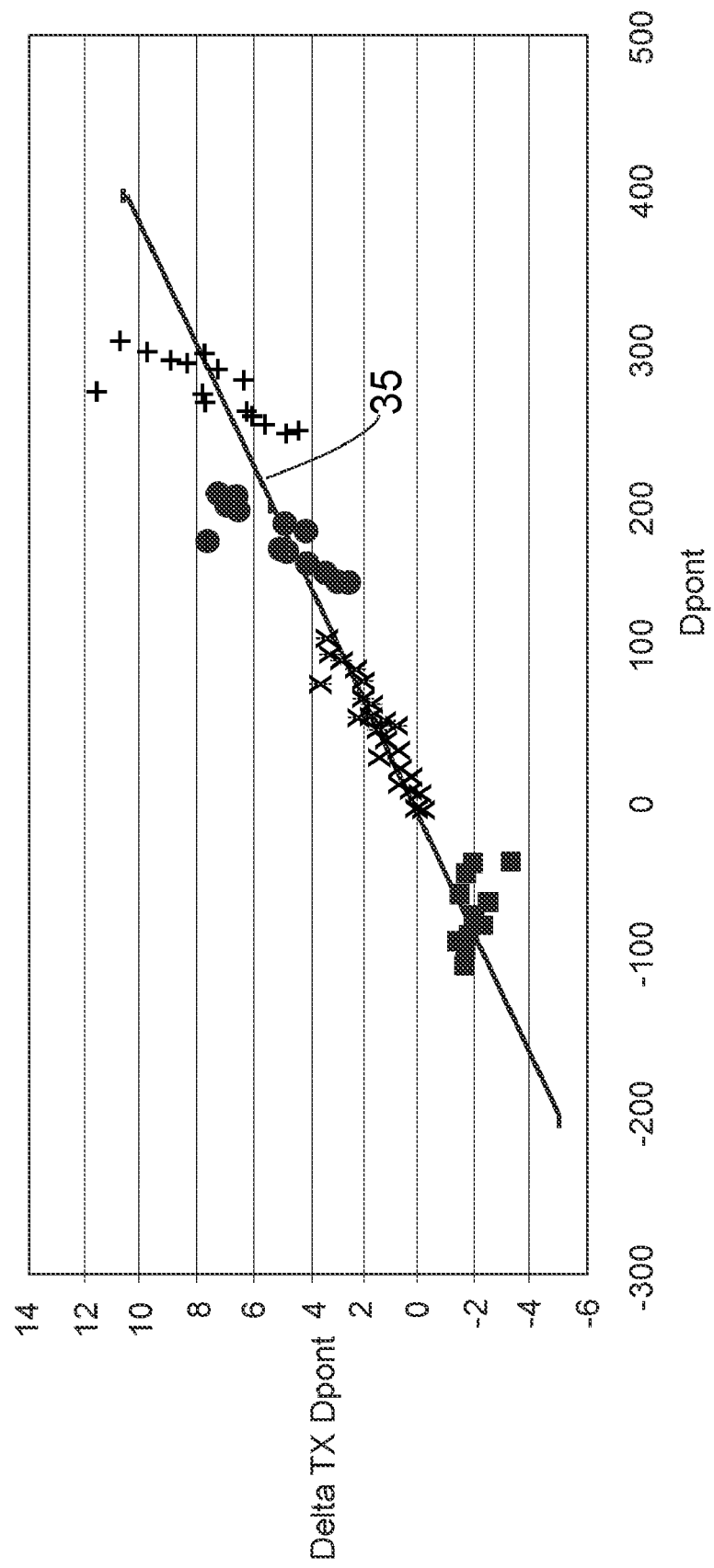
FIG. 7 shows the correlation between the variation of maximum exhaust temperature and the variation of the pressure drops in the exhaust pipes with respect to the standard value of 0 mmH2O.

Clearly, a linear approximation is provided, in which:
TXbase is the maximum exhaust temperature obtained at 100% of rotation speed of the low pressure shaft, pressure drops of 0 mmH2O in the exhaust and intake pipes and 60% relative humidity reference temperature (see FIG. 1); this is equivalent to the minimum value of TX found for the same PR from the curves 21 and 23 of FIG. 2;

DeltaTX_Dpin is the correction of the temperature TX due to the variation of the pressure drops in the intake pipes with respect to the nominal value of 0 mmH2O (see FIG. 6);

DeltaTX_Dpout is the correction of the temperature TX due to the variation of the pressure drops in the exhaust pipes with respect to the nominal value of 0 mmH2O (see FIG. 7);

DeltaTX_Hum is the correction of the temperature TX due to the variation of the relative humidity of the air with respect to the nominal value of 60% (see FIG. 5);

DeltaTX_PCNLP is the correction of the temperature TX due to the variation of the speed of the low pressure shaft with respect to the nominal value of 100%; this parameter is found as the difference between Txbase and the minimum value of TX found for the same PR from the curves of FIGS. 3 and 4.

In the above equation, therefore, the exhaust temperature TX is derived from a reference temperature TXbase, to which are added four corrections called DeltaTX_Dpin, DeltaTX_Dpout, DeltaTX_Hum and DeltaTX_PCNLP.

Each correction term relates to a single environmental or operating parameter which differs from the reference parameter, and is calculated by computer simulations of the gas turbine. The simulations are generated by setting the attainment of the maximum permissible temperatures Tfire or Trise, for each condition differing from the reference condition.

The exhaust temperature TX found by the above simulations is compared with the reference temperature TXbase, so that the correction terms can be evaluated appropriately as differences.

Since two control curves 21 and 23 have been defined, two temperatures TXbase are provided, and each correction term has to be added to both.

We will now describe the method of evaluating DeltaTX_PCNLP, in other words the exhaust temperature correction term due to differences between the speed of the low pressure turbine (to which the load is applied) and the reference speed.

The speed of the low pressure turbine is the most important parameter for the correction of the exhaust temperature TX, since it acts directly on the efficiency of the low pressure turbine and therefore also on Tfire.

So that this importance can be taken into account, a maximum exhaust temperature curve is generated for each speed considered.

The equation for evaluating the current exhaust temperature TX then becomes somewhat different from that stated above, in other words $$TX = TX\text{base}(PCNLP) + \text{Delta}TX\_D\text{pin} + \text{Delta}TX\_D\text{pout} + \text{Delta}TX\_\text{Hum}$$

where TXbase(PCNLP) is the reference temperature found for the specific speed of the low pressure turbine.

Clearly, there will be two values of TXbase(PCNLP): this is because there is a curve 21 for the maximum temperature Tfire and a curve 23 for the maximum permissible Trise. Thus the following formulae are required, with additional allowance for the dependence of the base curves on the compression ratio PR:

$$TX\_\max T\text{fire} = TX\text{base}\_\max T\text{fire}(PCNLP, PR) + \text{Delta}TX\_D\text{pin} + \text{Delta}TX\_D\text{pout} + \text{Delta}TX\_\text{Hum}$$

$$TX\_\max T\text{rise} = TX\text{base}\_\max T\text{rise}(PCNLP, PR) + \text{Delta}TX\_D\text{pin} + \text{Delta}TX\_D\text{pout} + \text{Delta}TX\_\text{Hum}.$$

Both of the temperature curves TXbase_maxTfire and TXbase_maxTrise can also be provided in the form of two-dimensional tables, since there are two independent variables, namely the compression ratio PR and the low pressure turbine speed PCNLP.

FIG. 3 shows a diagram of the maximum temperature TX, expressed in degrees Rankine, as a function of the compression ratio PR, which enables the maximum Tfire to be attained. It shows a set of curves 27, each for a specific value of speed PCNLP. More precisely, as this speed increases, the curve 27 generally has an increasingly negative slope, and is always of the type decreasing with a rise in the compression ratio PR.

FIG. 4 shows a diagram of the maximum temperature TX, expressed in degrees Rankine, as a function of the compression ratio PR, which enables the maximum Trise to be attained. It shows a set of curves 29, each for a specific value of speed PCNLP. More precisely, as this speed increases, the curve 29 generally has an increasingly negative slope, and is always of the type decreasing with a rise in the compression ratio PR.

We will now describe the method of evaluating the term DeltaTX_Hum, in other words the correction of temperature TX which allows for the environmental humidity.

In fact, the significant parameter for characterizing atmospheric humidity is not the relative humidity (RH), which also depends on the temperature and on atmospheric pressure, but specific humidity (SH) which is the absolute water content of the atmosphere.

Additionally, according to current practice, the curves of maximum exhaust temperature TX are found by assuming a constant relative humidity of 60%.

For these two reasons, the most convenient parameter for expressing the moisture content of the air appears to be the difference DeltaSH, defined as the difference between the actual specific humidity and the specific humidity at a relative humidity of 60% (in the same conditions of temperature and atmospheric pressure), according to the formula:

$$\text{Delta}SH = SH\_\text{current} - SH\_60\%\,RH.$$

When DeltaTX_Hum is plotted on a diagram as a function of DeltaSH, a linear correlation appears between these two variables.

Therefore, in order to implement the correction due to atmospheric humidity in the corrected parameter control method for a two-shaft gas turbine according to the invention, it is necessary to use two correlations, namely:

DeltaTX_Hum as a function of DeltaSH which is shown in FIG. 5;

SH_60% RH as a function of atmospheric temperature, which can be found by interpolating the following values, where the temperature is expressed in degrees Rankine:

SH_60% RH (T=419.67)=0.000070;
SH_60% RH (T=428.67)=0.000116;
SH_60% RH (T=437.67)=0.000188;
SH_60% RH (T=446.67)=0.000299;
SH_60% RH (T=455.67)=0.000464;
SH_60% RH (T=464.67)=0.000707;
SH_60% RH (T=473.67)=0.001059;
SH_60% RH (T=482.67)=0.001560;
SH_60% RH (T=491.67)=0.002263;
SH_60% RH (T=500.67)=0.003324;
SH_60% RH (T=509.67)=0.004657;
SH_60% RH (T=518.67)=0.006367;
SH_60% RH (T=527.67)=0.008670;
SH_60% RH (T=536.67)=0.011790;

SH_60% RH (T=545.67)=0.015966;
SH_60% RH (T=554.67)=0.021456;
SH_60% RH (T=563.67)=0.028552;
SH_60% RH (T=572.67)=0.037585;
SH_60% RH (T=581.67)=0.048949.

FIG. 5 shows the linear correlation, shown by the straight line 31, between DeltaTX_Hum, expressed in degrees Rankine, and DeltaSH.

We will now describe the parameter DeltaTX_Dpin, in other words the correction of temperature due to the pressure drop in the intake pipes.

Since a value of zero, in other words no drop, has been chosen as the reference for the drops in the intake pipes, the correction DeltaTX_Dpin can be expressed directly as a function of the measured pressure drop DPin.

By conducting various simulations, for which the attainment of max Tfire or max Trise with pressure drops different from zero had been specified, it was found that there was a correlation between Dpin and DeltaTX_Dpin. This correlation is linear to a first approximation and is shown in FIG. 6.

More precisely, FIG. 6 shows the linear correlation, shown by the straight line 33, between DeltaTX_Dpin, expressed in degrees Rankine, and Dpin, expressed in mm of water.

We will now examine DeltaTX_Dpout, in other words the correction of temperature due to the pressure drop in the exhaust pipes.

Since a value of zero, in other words no drop, has been chosen as the reference for the drops in the intake pipes, the correction DeltaTX_Dpout can be expressed directly as a function of the measured pressure drop DPout.

By conducting various simulations, for which the attainment of max Tfire or max Trise with pressure drops different from zero had been specified, it was found that there was a correlation between Dpout and DeltaTX_Dpout. This correlation is linear to a first approximation and is shown in FIG. 7.

More precisely, FIG. 7 shows the linear correlation, shown by the straight line 35, between DeltaTX_Dpout, expressed in degrees Rankine, and Dpout, expressed in mm of water.

$2^{nd}$ loop: we will now describe the control loop for controlling F/A (and consequently Trise) by controlling the opening of the bleed valve at partial loads. This valve is located between the atmosphere and the outlet of the axial compressor. The set point of the control loop controller is obtained from a set of TX-PR maps obtained for all operating conditions of the machine.

For each environmental condition, there is an infinite number of curves of exhaust temperature TX for attaining the nominal F/A (or nominal Trise): in particular, if other conditions remain constant, it is possible to define a control curve for each value of atmospheric temperature.

Figure 8:
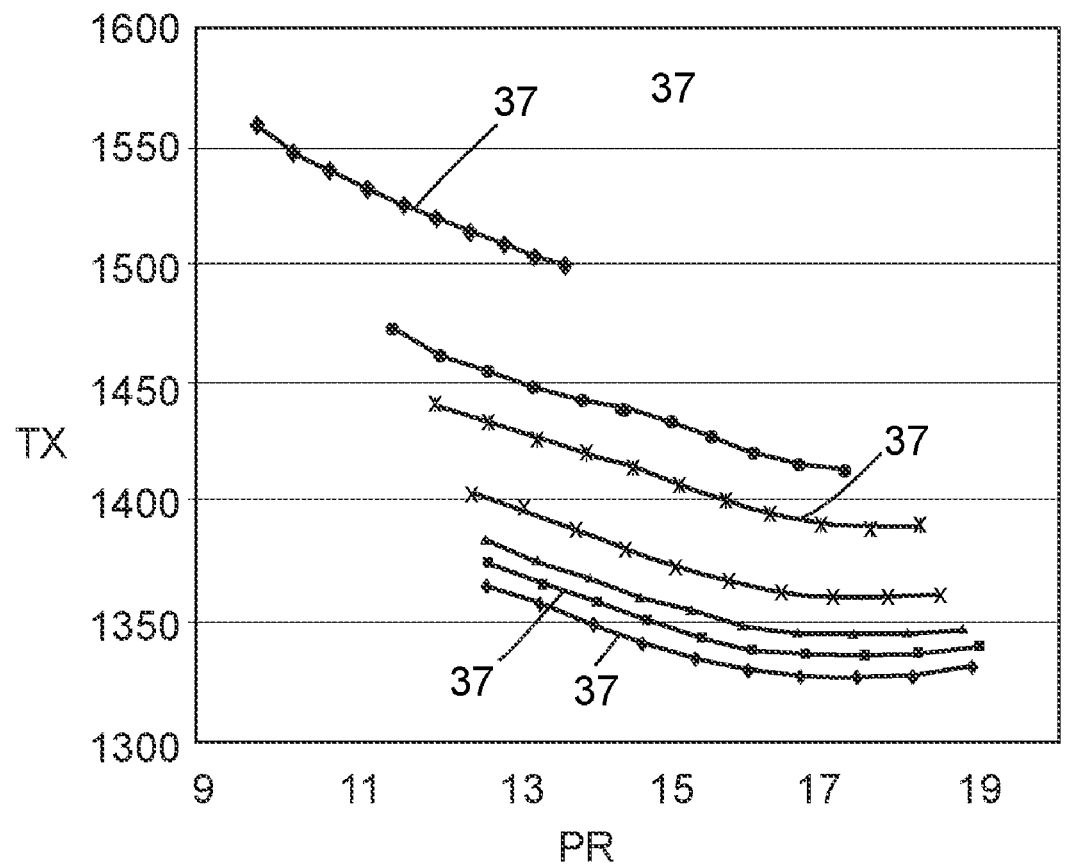
FIG. 8 shows a correlation between the exhaust temperature TX and the compression ratio PR and the ambient temperature (used as an independent parameter) relative to operating conditions in which the machine has reached the nominal value of F/A in standard conditions, in other words with a low pressure wheel speed of 100%, zero pressure drops in the intake and exhaust pipes and relative humidity of 60%; this curve represents the desired exhaust temperature for achieving the nominal value of F/A.

FIG. 8 shows a diagram of the maximum temperature TX for partial loads at a given speed of the low pressure shaft, expressed in degrees Rankine, as a function of the compression ratio PR. It shows a set of curves 37, each for a given value of atmospheric temperature. More precisely, as this temperature rises the curve 37 generally takes higher values, while always being of the type which decreases as the compression ratio PR increases.

Figure 9:
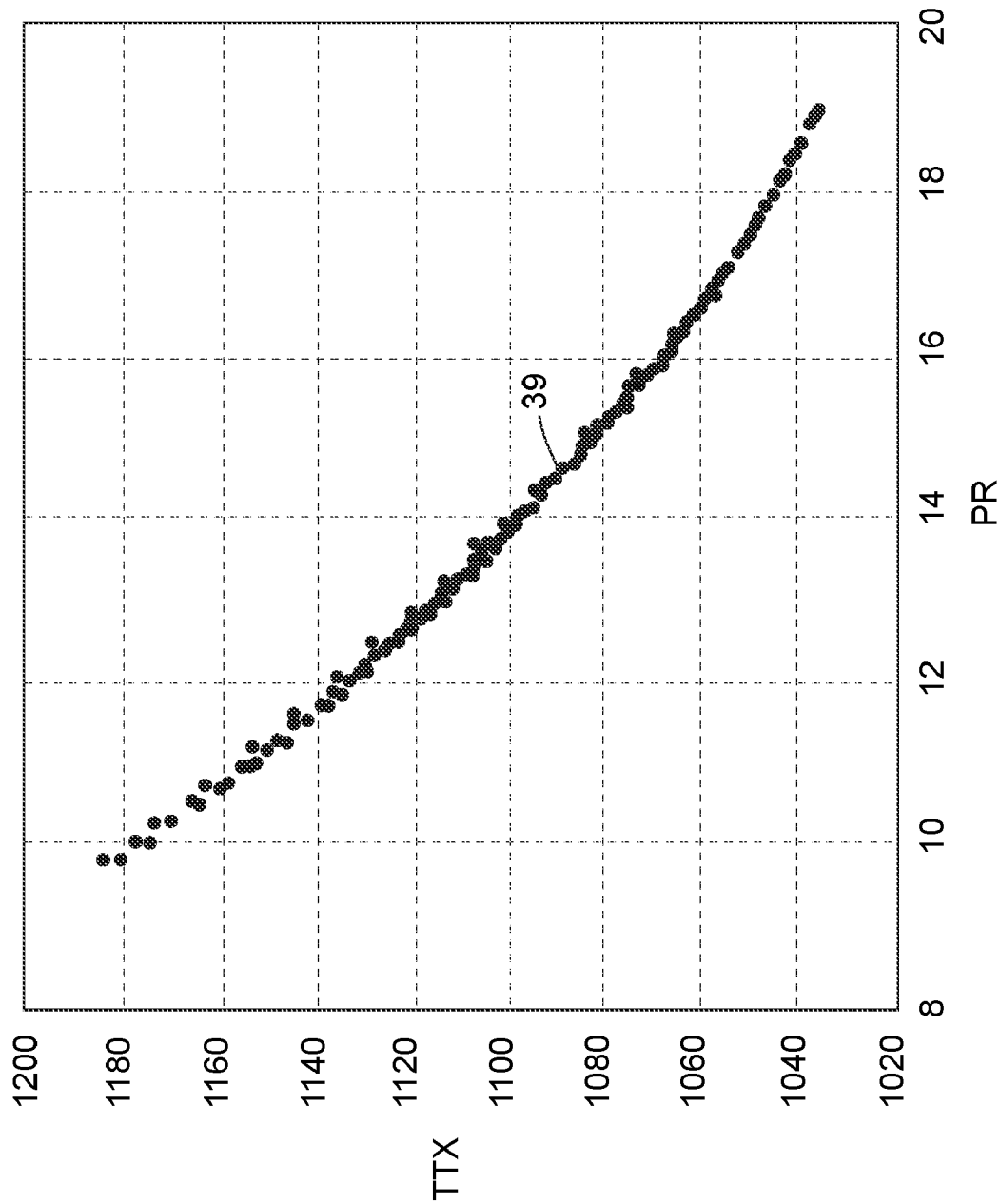
FIG. 9 is derived from FIG. 8 by nondimensionalizing it with respect to ambient temperature.

According to the present invention, a corrected parameter method is used, in which all the aforementioned curves 37 are reduced to a single curve 39, shown in FIG. 9, to eliminate the dependence on the atmospheric temperature.

The curve 39 is obtained by the following mathematical transformation:

$$TTX = TX \cdot (518.67/TCD)^x$$

where

TX is the actual exhaust temperature;

518.67 is a reference temperature which in this case is expressed in degrees Rankine;

TCD is the exhaust temperature of the compressor, expressed in a unit of measurement compatible with that of the constant, and therefore in degrees Rankine in this case;

X is a nondimensional exponent calculated in such a way as to minimize the mean quadratic deviation between the values of TTX calculated in this way and the interpolation curve 39;

TTX is the exhaust temperature transformed by the preceding relation, referred to hereafter as the reduced temperature.

When the actual value of PR is known, and after application of the inverse of the above transformation, the curve 39 yields the set point for the TX controller of the control loop for F/A (and consequently for Trise).

Using the curve 39 makes it unnecessary to enter the large number of points which would be required to describe all the curves 37 of FIG. 8.

Even if the dependence on atmospheric temperature is removed, the curve of temperature TX for partial loads depends on the following conditions:
pressure drop in the intake pipes;
pressure drop in the exhaust pipes;
atmospheric humidity;
load characteristics (for example, by correlation between load and speed).

In a similar way to what has been described above in relation to the maximum exhaust temperature curve, the corrected parameter control method for gas turbines makes it possible to take into account operating conditions differing from the design conditions for the case of partial load control curves.

This is expressed by the formula:

$$TX = TXbase + DeltaTX\_DPin + DeltaTX\_Dpout + DeltaTX\_RH + DeltaTX\_PCNLP$$

where TXbase is obtained by inverting the formula given previously, thus:

$$TXbase = TTX/((518.67/TCD)^x).$$

Each term of the above equation represents a correction to the reference temperature curve which takes the aforementioned parameters into consideration.

Each correction term is calculated by computer simulations of the gas turbine. The simulations are conducted by specifying the attainment of the desired F/A ratio (and consequently the attainment of the desired Trise), for each condition differing from the reference condition and at different partial loads.

The exhaust temperature TX found by the preceding simulations is compared with the reference temperature TXbase, in order to evaluate the correction terms in the appropriate way as differences.

We will now describe the method of evaluating the term DeltaTX_PCNLP, in other words the correction of exhaust temperature due to the speed of the low pressure turbine to which the load is applied.

As stated previously, the low pressure turbine speed is the most important parameter for the correction of the exhaust temperature TX, since it acts directly on the efficiency of the low pressure turbine and therefore also on Tfire.

To take this importance into account, a partial load exhaust temperature curve is generated for each speed considered.

The equation for evaluating the current exhaust temperature TX therefore becomes somewhat different from that given above, thus:

$$TX = TXbase(PCNLP) + \text{Delta}TX\_DPin + \text{Delta}TX\_Dpout + \text{Delta}TX\_RH$$

where TXbase(PCNLP) is the reference temperature found for the specific speed of the low pressure turbine.

Figure 10:
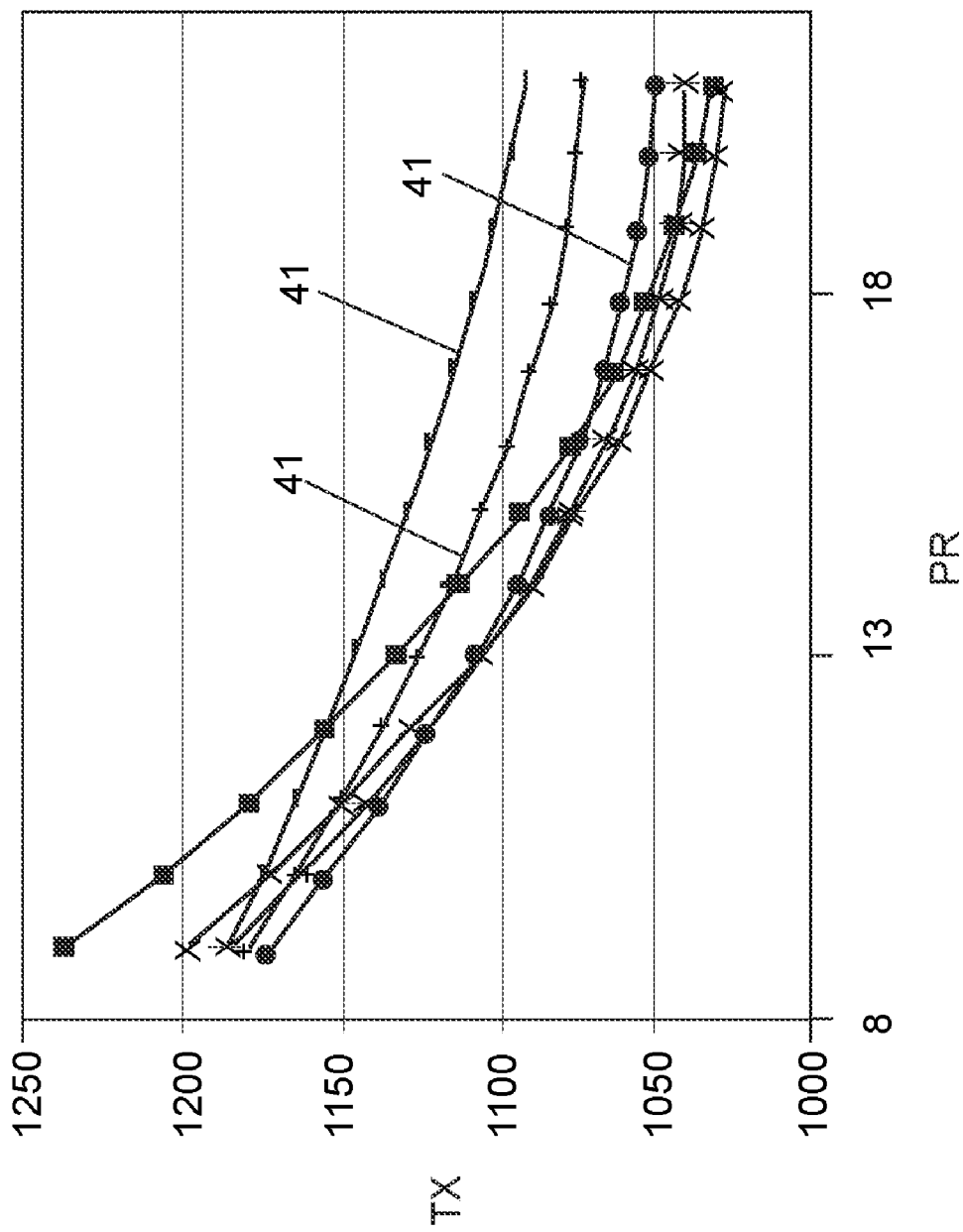
FIG. 10 shows the set of nondimensionalized curves (as in FIG. 9) relating to different speeds of the low pressure wheel.

FIG. 10 shows a diagram of the reduced temperature TTX, expressed in degrees Rankine, as a function of the compression ratio PR. It shows a set of curves 41, one for each given value of speed PCNLP. To find the true value of the parameter TXbase, the value of the exponent X must be known; this exponent is a function of the speed of the low pressure wheel, and typical values for a two-shaft turbine are given below by way of example:

if PCNLP=105%, X=0.323
if PCNLP=100%, X=0.33225
if PCNLP=90%, X=0.34
if PCNLP=80%, X=0.34425
if PCNLP=70%, X=0.351
if PCNLP=60%, X=0.348
if PCNLP=50%, X=0.3505.

We will now describe the method of evaluating DeltaTX_RH, in other words the correction of temperature due to environmental humidity.

The reference value of environmental humidity is 60%. The current value of the water content in the air (specific humidity) is not constant, but depends on the atmospheric temperature.

To evaluate the effects of humidity in different conditions, the following were considered in the invention:

three ambient temperatures (very cold day, ISO standard conditions, very hot day);
three levels of relative humidity (0%, 60%, 100%);
load characteristics according to a cubic law.

Thus nine simulations were conducted, specifying the attainment of the desired value of F/A and therefore of Trise, in order to achieve the reference level. The current values of TX were then plotted on a diagram as functions of PR.

The difference between the aforesaid diagram and the base curves yields DeltaTX_RH; this is expressed as a formula thus:

$$\text{Delta}TX\_RH = TX - TXbase.$$

Figure 11:
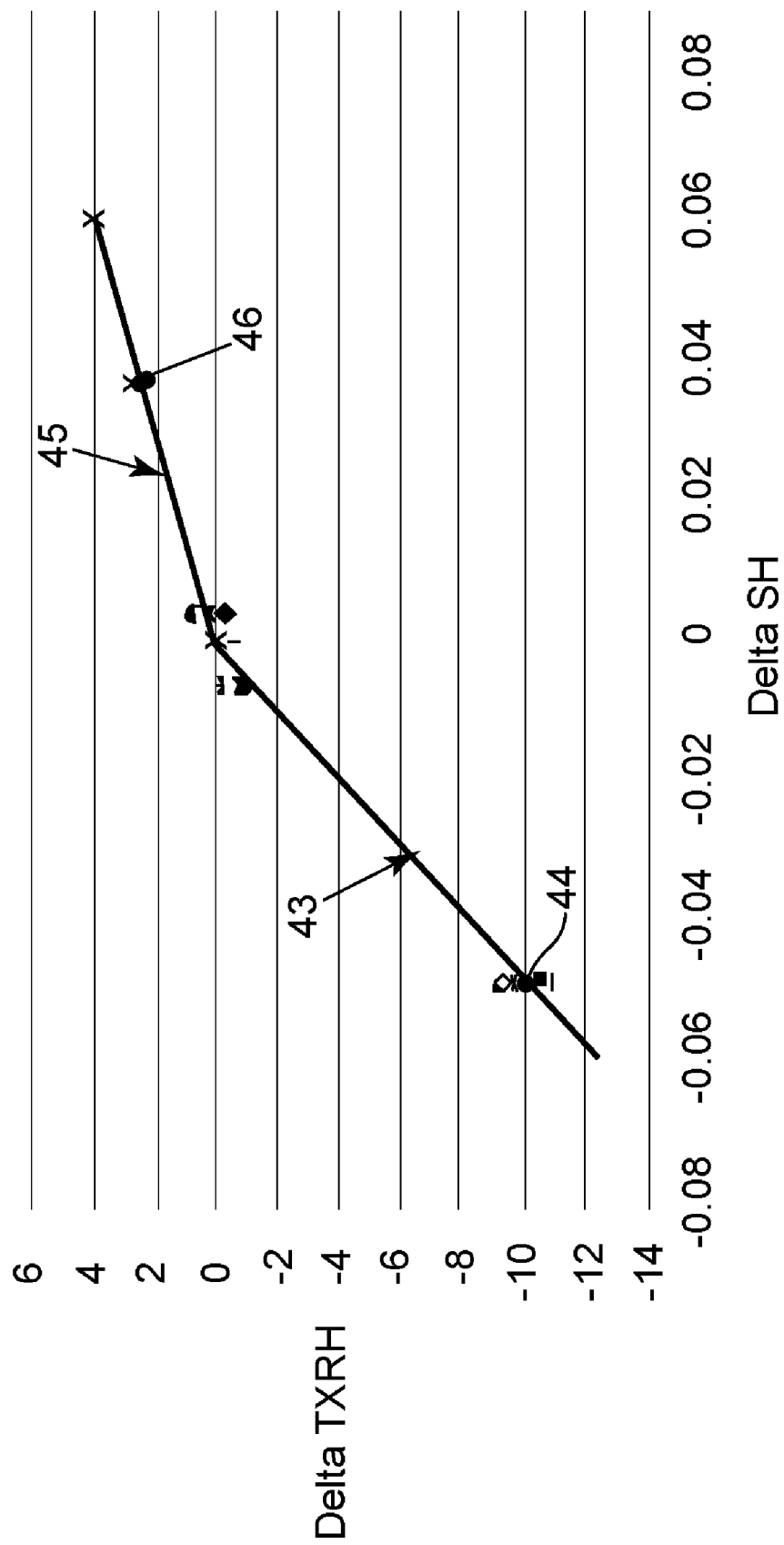
FIG. 11 shows the correlation between the variation of the exhaust temperature required to achieve the nominal F/A and the variation of the environmental humidity with respect to the standard value of 60%.

The values of DeltaTX_RH, expressed in degrees Rankine, are plotted in FIG. 11 as a function of DeltaSH, where DeltaSH is defined as the difference between the current value of specific humidity SH_current and the specific humidity at RH=60%, SH_60% RH, which is the reference value. This is expressed as a formula thus:

$$\text{Delta}SH = SH\_current - SH\_60\% RH.$$

FIG. 11 shows two straight lines 43 and 45, rising with an increase in DeltaSH, in which the straight line 43, valid where DeltaSH is less than 0, has a greater slope than the straight line 45, valid where DeltaSH is greater than 0, the two straight lines 43 and 45 passing through a point near the origin of the axes. For example, the point 44 on the straight line 43 indicates various partial loads at an ambient temperature of 50° C. with RH=0%; the point 46 on the straight line 45 indicates various partial loads at an ambient temperature of 50° C. with RH=100%.

More particularly, FIG. 11 shows that:

for a given DeltaSH, DeltaTX_RH is practically independent of the load and thus also of the compression ratio PR (a maximum deviation of 3° F. is observed at 50° C. with an RH of 0%);
DeltaTX_TH is linearly proportional to DeltaSH, as shown by the two portions of straight line 43 and 45.

The relation between SH_60% RH and the ambient temperature has already been described.

We will now describe the parameter DeltaTX_Dpin, in other words the correction of exhaust temperature due to the pressure drop in the intake pipes.

Since the value of zero, in other words no drop, was chosen as the reference for the pressure drops in the intake pipes, the correction DeltaTX_Dpin can be expressed directly as a function of the measured pressure drop DPin.

To calculate the effects of the pressure drop in the intake pipes in different conditions, the following were considered in the invention:

three ambient temperatures (very cold day, ISO standard conditions, very hot day);
three pressure drops in the intake (0, 100 and 200 mm of water);
load characteristics according to a cubic law.

The pressure drops considered were appropriately decreased at a partial load.

Thus nine simulations were conducted, specifying the attainment of the desired value of F/A, and therefore of Trise, in order to achieve the reference level. The current values of TX were then plotted on a diagram as functions of PR.

The difference between the aforesaid diagram and the base curves yields DeltaTX_Dpin; this is expressed as a formula thus:

$$\text{Delta}TX\_Dpin = TX - TXbase.$$

Figure 12:
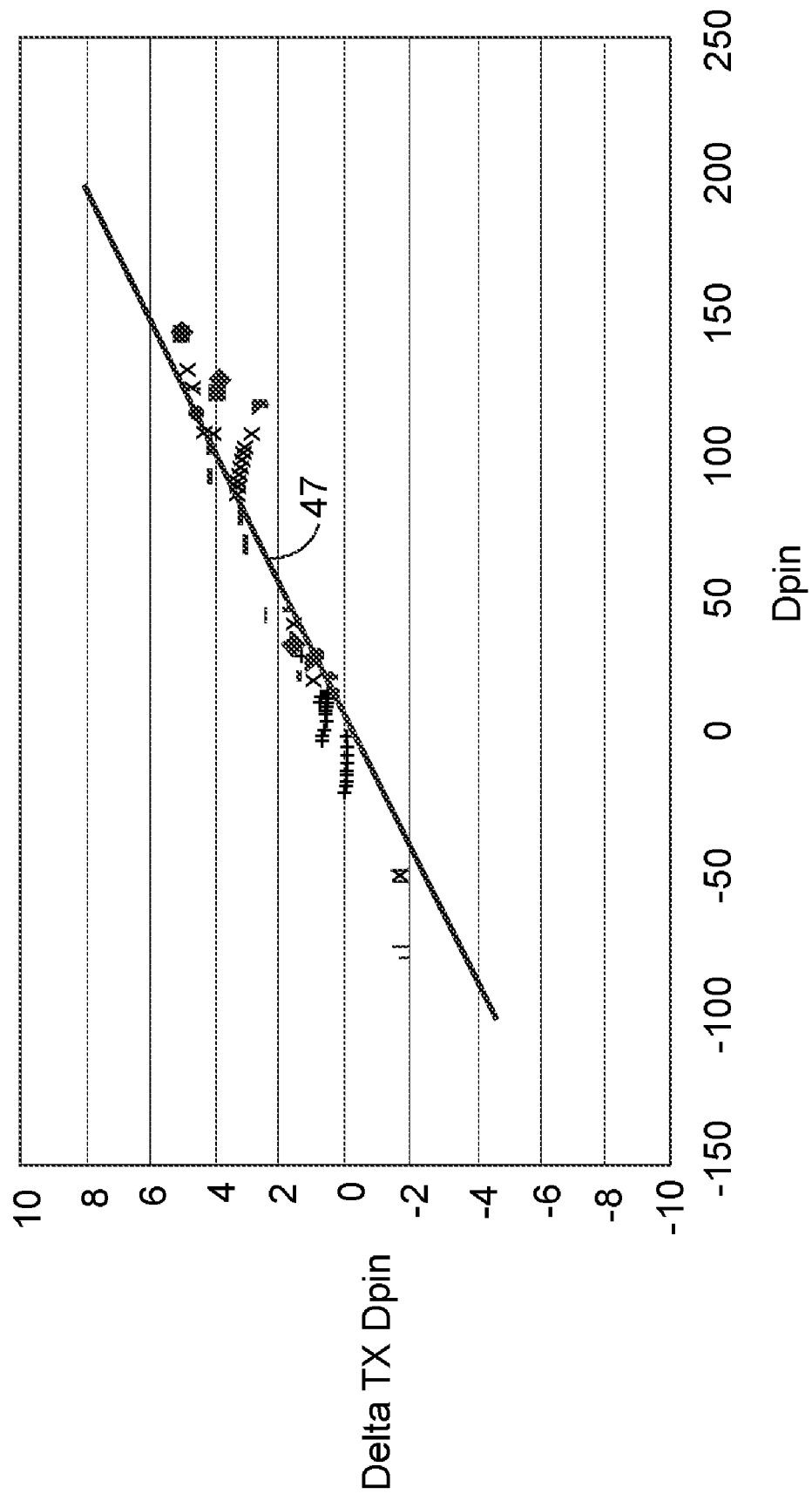
FIG. 12 shows the correlation between the variation of exhaust temperature required to achieve nominal F/A and the variation of the pressure drops in the intake pipes with respect to the standard value of 0 mmH20.

The values of DeltaTX_Dpin, expressed in degrees Rankine, are plotted in FIG. 12 as a function of Dpin.

FIG. 12 shows a straight line 47, rising with an increase in Dpin, expressed in mm of water.

More particularly, FIG. 12 shows that:

for a given Dpin, the DeltaTX_Dpin is practically independent of the load and thus also of the compression ratio PR (a maximum deviation of 2° F. was observed);
DeltaTX_Dpin is linearly proportional to Dpin.

We will now describe the parameter DeltaTX_Dpout, in other words the correction of temperature due to the pressure drop in the exhaust pipes.

Since the value of zero, in other words no drop, was chosen as the reference for the pressure drops in the exhaust pipes, the correction DeltaTX_Dpout can be expressed directly as a function of the measured pressure drop DPout.

To calculate the effects of the pressure drop in the exhaust pipes in different conditions, the following were considered in the invention:

three ambient temperatures (very cold day, ISO standard conditions, very hot day);
three pressure drops in the exhaust (0, 100 and 200 mm of water);
load characteristics according to a cubic law.

The pressure drops considered were appropriately decreased at a partial load.

Thus nine simulations were conducted, specifying the attainment of the desired value of F/A, and therefore of Trise, in order to achieve the reference level. The current values of TX were then plotted on a diagram as functions of PR.

The difference between the aforesaid diagram and the base curves yields DeltaTX_Dpout; this is expressed as a formula thus:

DeltaTX_Dpout=TX−TXbase.

The values of DeltaTX_Dpout, expressed in degrees Rankine, are plotted in FIG. 13 as a function of Dpout.

FIG. 13 shows a straight line 49, rising with an increase in Dpout, expressed in mm of water.

In conclusion, in view of the above description, according to the corrected parameter control method for a two-shaft gas turbine according to the present invention, the correlation for calculating the maximum exhaust temperature TX is:

TX=TTX(PCNLP,PR)/((518.67/TCD)$^{X(PCNLP)}$)+
DeltaTX_RH(DeltaSH)+DeltaTX_Dpin(Dpin)+
DeltaTX_Dpout(Dpout).

The method according to the present invention can be applied advantageously in a two-shaft gas turbine with a dry nitrogen oxide (NOx) reduction system (also called a Dry Low NOx or DLN system).

The characteristics and the advantages of the corrected parameter control method for a two-shaft gas turbine according to the present invention are made clear by the above description.

It should be emphasized, in particular, that the introduction of corrected parameters into the control of DLN two-shaft turbines makes it possible to correct and eliminate effects due to disturbance factors by means of simple relations which can be implemented easily in existing control panels.

Finally, it is clear that the corrected parameter control method for a two-shaft gas turbine devised in this way can be modified and varied in numerous ways without departure from the invention; furthermore, all components can be replaced with equivalent elements or parameters.

Thus. according to exemplary embodiments, a method for controlling a gas turbine can include the steps illustrated in FIG. 14a. Therein, the control method for a gas turbine includes the step of opening of at least one fuel valve to maintain a temperature of gas in an inlet of the gas turbine and a fuel air ratio within predetermined limits as shown in step 1400. This controlling can be accomplished by calculating a set point exhaust temperature as a sum of a reference temperature and a plurality of correction values each of which are associated with a different operating parameter. as shown in step 1402. According to another exemplary embodiment, a control method for a gas turbine includes the step illustrated in the flowchart of FIG. 14b. Therein, controlling opening of a vent valve is performed to maintain a temperature rise of gas in a combustion chamber of the gas turbine within predetermined limits using values of an exhaust temperature as a function of a compression ratio, which values have been obtained for a plurality of operating conditions as shown in step 1404. The scope of protection of the invention is therefore delimited by the attached claims.

The invention claimed is:

1. A control method for a gas turbine comprising:
controlling opening of at least one fuel valve to maintain a temperature (Tfire) of gas at an inlet of the gas turbine and a fuel-air ratio (F/A) within predetermined limits by:
calculating a set point exhaust temperature (TX) as a sum of a reference temperature (TXbase) and a plurality of correction values each of which are associated with a different operating parameter;
wherein corrections values are calculated by computer simulations of the gas turbine, the simulations being conducted by specifying attainment of one of: a maximum of the set point exhaust temperature (TXmaxTfire) and a maximum of the fuel-air ratio (F/A), for each condition differing from a reference condition;
further wherein said plurality of correction values includes four corrections values and wherein said step of calculating further comprises calculating:

TX=TXbase+DeltaTX_Dpin+DeltaTX_Dpout+
DeltaTX_Hum+DeltaTX_PCNLP where:
TX is said set point exhaust temperature:
DeltaTX_Dpin is a correction value for the set point exhaust temperature (TX) associated with a variation of pressure drops in intake pipes with respect to a nominal value of 0 mmH2O,
DeltaTX_Dpout is a correction value for the set point exhaust temperature (TX) associated with a variation of pressure drops in exhaust pipes with respect to a nominal value of 0 mmH2O,
DeltaTX_Hum is a correction value for the set point exhaust temperature (TX) associated with a variation of a relative humidity of air with respect to a nominal value of 60%, and
DeltaTX_PCNLP is a correction value for the set point exhaust temperature (TX) associated with a variation of a speed of a low pressure shaft with respect to a nominal value of 100%.

2. The control method of claim 1, wherein a maximum exhaust temperature curve is generated for each of a plurality of speeds associated with said gas turbine.

3. The control method of claim 2, wherein said reference temperature (TXbase) is a reference temperature associated with one of said plurality of speeds associated with said gas turbine (Txbase(PCNLP)).

4. The control method of claim 3, wherein there are two values of TXbase(PCNLP), a first value related to a curve of maximum temperature (Tfire) and a second value related to a curve of maximum increase of temperature (Trise) of a gas in a combustion chamber of the gas turbine.

5. The control method of claim 4, further comprising calculating said first value as:

TXmaxTfire=TxbasemaxTfire(PCNLP,PR)+
DeltaTX_DPin+DeltaTX_Dpout+DeltaTX_Hum, and calculating said second value as:

TXmaxTrise=TxbasemaxTrise(PCNLP,PR)+
DeltaTX_DPin+DeltaTX_Dpout+DeltaTX_Hum, where:
TXmaxTfire is said maximum of the set point exhaust temperature;
TxbasemaxTfire is a temperature curve associated with said maximum of the set point exhaust temperature;
TxbasemaxTrise is a temperature curve associated with a maximum permissible rise in temperature;
PR indicates values having a dependence on a compression ratio (PR).

6. The control method of claim 5, further comprising the step of:
providing said temperature curves TXbasemaxTfire and TXbasemaxTrise as two-dimensional tables, with the compression ratio (PR) and the gas turbine speed (PCNLP) as independent variables.

7. The control method of claim 5, wherein said maximum temperature (TXmaxTfire), as a function of the compression ratio PR which enables said maximum (TXmaxTfire) to be attained, is a set of curves, each curve associated with a specific value of speed PCNLP, each successive curve generally having an increasingly negative slope as speed increases, and decreasing with a rise in compression ratio PR.

8. The control method of claim 5, wherein said maximum temperature (TXmaxTrise), as a function of the compression ratio PR which enables the maximum (TXmaxTrise) to be attained, is a set of curves, each curve associated with a specific value of speed PCNLP, each successive curve generally having an increasingly negative slope as speed increases, and decreasing with a rise in the compression ratio PR.

9. The control method of claim 1, wherein the correction value DeltaTX_Hum depends on a specific humidity (SH) and is expressed as a function of a difference (DeltaSH), which difference (DeltaSH) is defined as a difference between a current specific humidity (SH current) and a specific humidity (SH_60%RH) at a relative humidity RH of 60%.

10. The control method of claim 9, wherein there is a linear correlation between the correction value DeltaTX_Hum and the difference (DeltaSH).

11. The control method of claim 10, further comprising the step of: determining the specific humidity (SH 60%RH) at a relative humidity of RH 60% as a function of atmospheric temperature by interpolating the following values, where the temperature is expressed in degrees Rankine:

| | | |
|---|---|---|
| SH_60% RH | (T = 419.67) | = 0.000070 |
| SH_60% RH | (T = 428.67) | = 0.000116 |
| SH_60% RH | (T = 437.67) | = 0.000188 |
| SH_60% RH | (T = 446.67) | = 0.000299 |
| SH_60% RH | (T = 455.67) | = 0.000464 |
| SH_60% RH | (T = 464.67) | = 0.000707 |
| SH_60% RH | (T = 473.67) | = 0.001059 |
| SH_60% RH | (T = 482.67) | = 0.001560 |
| SH_60% RH | (T = 491.67) | = 0.002263 |
| SH_60% RH | (T = 500.67) | = 0.003324 |
| SH_60% RH | (T = 509.67) | = 0.004657 |
| SH_60% RH | (T = 518.67) | = 0.006367 |
| SH_60% RH | (T = 527.67) | = 0.008670 |
| SH_60% RH | (T = 536.67) | = 0.011790 |
| SH_60% RH | (T = 545.67) | = 0.015966 |
| SH_60% RH | (T = 554.67) | = 0.021456 |
| SH_60% RH | (T = 563.67) | = 0.028552 |
| SH_60% RH | (T = 572.67) | = 0.037585 |
| SH_60% RH | (T = 581.67) | = 0.048949. |

12. The control method of claim 1, wherein the correction value DeltaTX_Dpout is expressed directly as a function of a measured pressure drop (DPout).

13. The control method of claim 12, wherein there is a linear correlation between the correction value DeltaTX_Dpout and the measured pressure drop (Dpout).

14. A control method for a gas turbine comprising:
controlling opening of a vent valve to maintain a temperature rise (Trise) of gas in a combustion chamber of the gas turbine within predetermined limits using values of an exhaust temperature (TX) as a function of a compression ratio (PR), which values have been obtained for a plurality of operating conditions of the gas turbine; and
calculating the exhaust temperature (TX) as a linear approximation of a sum of a reference temperature (Txbase) plus correction values associated with an environmental or operating parameter.
wherein there are four of the correction values such that the exhaust temperature (TX) is expressed as:

TX=TXbase+DeltaTX_DPin+DeltaTX_Dpout+ DeltaTX_Hum+DeltaTX_PCNLP where:
TXbase is determined as: TXbase=TTX/((518.67/TCD)x), where:
518.67 is a reference temperature;
TCD is an exhaust temperature of a compressor, expressed in a unit of measurement compatible with that of the reference temperature;
x is a nondimensional exponent calculated to minimize a mean quadratic deviation between values of TTX and the single control function; and
TTX is a transformed exhaust temperature;
DeltaTX_Dpin is a correction value for the exhaust temperature (TX) associated with a variation of pressure drops in intake pipes with respect to a nominal value of 0 mm H2O; DeltaTX_Dpout is a correction value for the exhaust temperature (TX) associated with a variation of pressure drops in exhaust pipes with respect to a nominal value of 0 mm H2O;
DeltaTX_Hum is a correction value for the exhaust temperature (TX) associated with a variation of relative humidity of air with respect to a nominal value of 60%; and
DeltaTX_PCNLP is a correction value for the exhaust temperature (TX) due to a variation of a low pressure shaft speed with respect to a nominal value of 100%.

15. The control method of claim 14, wherein said values are associated with a control function that is defined for each of a plurality of values of atmospheric temperature.

16. The control method of claim 15, wherein said control functions represent a relationship between the exhaust temperature (TX) for partial loads at a given speed of a low pressure shaft of the gas turbine and the compression ratio (PR), wherein each control function is associated with a value of atmospheric temperature, each control function generally having higher values as temperature rises and decreasing as the compression ratio (PR) decreases.

17. The control method of claim 14, wherein said values are associated with a single control function without a dependence on atmospheric temperature.

18. The control method of claim 17, further comprising:
determining a set point associated with said controlling step based on inverse of the transformation for a known compression ratio (PR).

19. The control method of claim 14, wherein a set of functions, one for each value of speed (PCNLP), is expressed in terms of the maximum temperature (TX) as a function of the compression ratio (PR).

20. The control method of claim 19, further comprising:
evaluating said exhaust temperature (TX) by calculating:

TX=TXbase(PCNLP)+DeltaTX_DPin+DeltaTX_D- pout+DeltaTX_RH where:
TXbase(PCNLP) is a reference temperature associated with a speed of the gas turbine; and
DeltaTX_RH is a change in exhaust temperature associated with relative humidity.

21. The control method of one of claims 18 or 20, wherein the exponent X is a function of a speed of a low pressure wheel of the gas turbine.

22. The control method of claim 21, wherein the exponent X, for intermediate speeds (PCNLP), is calculated by interpolation of values of X which have been calculated at other speeds (PCNLP) as follows:
if PCNLP=105%, X=0.323;
if PCNLP=100%, X=0.33225;
if PCNLP=90%, X=0.34;

if PCNLP=80%, X=0.34425;
if PCNLP=70%, X=0.351;
if PCNLP=60%, X=0.348; or
if PCNLP=50%, X=0.3505.

23. The control method of claim 20, wherein the correction value DeltaTX_RH is calculated based on three ambient temperatures, three levels of relative humidity, and load characteristics according to a cubic law.

24. The control method of claim 23, wherein nine simulations are conducted, each associated with different fuel-air ratio F/A values, to determine a reference level, current values of TX are then plotted as functions of PR, while a difference between the functions and base curves yields the correction value DeltaTX_RH, as expressed in the formula:

DeltaTX_RH =TX−TXbase.

25. The control method of claim 24, wherein said values of the correction value DeltaTX_RH are plotted as a function of a difference (DeltaSH) between a current value of specific humidity (SH_current) and a specific humidity at a relative humidity of 60% (SH_60%RH) such that:

DeltaSH=SH_current−SH_60% RH.

26. The control method of claim 25, wherein the function comprises two straight lines rising with an increase in the difference (DeltaSH), of which a first one of said straight lines is valid when DeltaSH is less than 0 and has a greater slope than a second one of said straight lines which is valid when DeltaSH is greater than 0, the two straight lines passing through a point near an origin of the function's axes.

27. The control method of claim 14, wherein the correction value DeltaTX_Dpin is a function of a measured pressure drop (DPin).

28. The control method of claim 27, further comprising the step of:
determining said correction value DeltaTX_Dpin taking into account three ambient temperatures, three pressure drops in an intake and load characteristics according to a cubic law.

29. The control method of claim 28, wherein nine simulations are conducted, each associated with different fuel-air ratio F/A values, to reach a reference level, current values of TX are then plotted as functions of PR, while a difference between the functions and base curves yields the correction value DeltaTX_Dpin, as expressed in the formula:

DeltaTX_Dpin=TX−TXbase.

30. The control method of claim 29, wherein said correction values (DeltaTX_Dpin) are linearly correlated with the measured pressure drop Dpin such that the correction values of DeltaTX_Dpin increase with a rise in the measured pressure drop Dpin.

31. The control method of claim 14, wherein the correction value (DeltaTX_Dpout) is a function of the measured pressure drop DPout.

32. The control method of claim 31, further comprising: determining said correction value DeltaTX_Dpout taking into account three ambient temperatures, three pressure drops in the exhaust and load characteristics according to a cubic law.

33. The control method of claim 32, wherein nine simulations are conducted, each associated with different fuel-air ratio F/A values, to reach a reference level, the current values of TX are then plotted as functions of PR, while a difference between the functions and base curves yields the correction value DeltaTX_Dpout, as expressed in the formula:

DeltaTX_Dpout=TX−TXbase.

34. The control method of claim 33, wherein the correction values DeltaTX_Dpout are linearly correlated with the exhaust pressure Dpout, such that the correction values DeltaTX_Dpout increase with a rise in the exhaust pressure Dpout.

35. The control method of claims 26, 30 or 34, wherein a correlation for calculating the maximum exhaust temperature TX is:

TX=TTX(PCNLP, PR)/((518.67/TCD)x(PCNLP)+
DeltaTX_RH (DeltaSH)+DeltaTX_Dpin (Dpin)+
DeltaTX_Dpout (Dpout).

36. The control method of claim 1 or 14, wherein said control method is used to control a two-shaft gas turbine and further comprising the step of:
providing said two-shaft gas turbine with a dry nitrogen oxide (NOx) reduction system.

37. A control method for a gas turbine comprising:
controlling opening of at least one fuel valve to maintain a temperature (Tfire) of gas at an inlet of the gas turbine and a fuel-air ratio (F/A) within predetermined limits by:
calculating a set point exhaust temperature (TX) as a sum of a reference temperature (TXbase) and a plurality of correction values each of which are associated with a different operating parameter;
wherein said plurality of correction values includes four corrections values and wherein said step of calculating further comprises calculating:

TX=TXbase+DeltaTX_Dpin+DeltaTX_Dpout+
DeltaTX_Hum+DeltaTX_PCNLP where:
TX is said set point exhaust temperature:
DeltaTX_Dpin is a correction value for the set point exhaust temperature (TX) associated with a variation of pressure drops in intake pipes with respect to a nominal value of 0 mmH2O,
DeltaTX_Dpout is a correction value for the set point exhaust temperature (TX) associated with a variation of pressure drops in exhaust pipes with respect to a nominal value of 0mmH2O,
DeltaTX_Hum is a correction value for the set point exhaust temperature (TX) associated with a variation of a relative humidity of air with respect to a nominal value of 60%, and
DeltaTX_PCNLP is a correction value for the set point exhaust temperature (TX) associated with a variation of a speed of a low pressure shaft with respect to a nominal value of 100%; and
controlling opening of a vent valve to maintain a temperature rise (Trise) of gas in a combustion chamber of the gas turbine within predetermined limits using values of an exhaust temperature (TX) as a function of a compression ratio (PR), which values have been obtained for a plurality of operating conditions of the gas turbine.

* * * * *

UNITED STATES PATENT AND TRADEMARK OFFICE
CERTIFICATE OF CORRECTION

PATENT NO. : 7,634,914 B2 Page 1 of 1
APPLICATION NO. : 10/539271
DATED : December 22, 2009
INVENTOR(S) : Casoni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Twenty-first Day of December, 2010

David J. Kappos
*Director of the United States Patent and Trademark Office*